United States Patent
Evangelos et al.

(10) Patent No.: US 8,212,437 B2
(45) Date of Patent: Jul. 3, 2012

(54) SUPERCONDUCTING MULTI-POLE ELECTRICAL MACHINE

(75) Inventors: Laskaris Trifon Evangelos, Schenectady, NY (US); James Pelligrino Alexander, Ballston Lake, NY (US); Kiruba Sivasubramaniam, Troy, NY (US)

(73) Assignee: General Electric Company, Niskayuna, NY (US)

( * ) Notice: Subject to any disclaimer, the term of this patent is extended or adjusted under 35 U.S.C. 154(b) by 2006 days.

(21) Appl. No.: 11/076,359

(22) Filed: Mar. 9, 2005

(65) Prior Publication Data

US 2005/0248222 A1 Nov. 10, 2005

Related U.S. Application Data

(62) Division of application No. 10/249,641, filed on Apr. 28, 2003, now Pat. No. 7,547,999.

(51) Int. Cl.
*H02K 9/00* (2006.01)
(52) U.S. Cl. .......................................................... 310/52
(58) Field of Classification Search .................... 310/52, 310/54, 254, 201, 261
See application file for complete search history.

(56) References Cited

U.S. PATENT DOCUMENTS

| | | | |
|---|---|---|---|
| 3,837,072 A * | 9/1974 | Moberg | 29/596 |
| 3,942,053 A | 3/1976 | Abolins et al. | |
| 3,991,333 A * | 11/1976 | Laskaris | 310/52 |
| 4,060,742 A | 11/1977 | Litz | |
| 4,275,320 A | 6/1981 | Baumann et al. | |
| 4,278,905 A | 7/1981 | Chari et al. | |
| 4,295,068 A | 10/1981 | Gamble | |
| 4,329,602 A | 5/1982 | Gillet | |
| 4,409,502 A * | 10/1983 | McCabria | 310/61 |
| 5,508,613 A | 4/1996 | Kotsubo et al. | |
| 5,570,503 A | 11/1996 | Stokes | |
| 5,672,921 A | 9/1997 | Herd et al. | |
| 5,774,032 A * | 6/1998 | Herd et al. | 335/216 |
| 6,066,906 A | 5/2000 | Kalsi | |
| 6,140,719 A | 10/2000 | Kalsi | |
| 6,169,353 B1 | 1/2001 | Driscoll et al. | |
| 6,313,556 B1 | 11/2001 | Dombrovski et al. | |
| 6,412,289 B1 | 7/2002 | Laskaris et al. | |
| 6,438,969 B1 | 8/2002 | Laskaris et al. | |
| 6,441,521 B1 | 8/2002 | Dombrovski et al. | |
| 6,489,701 B1 | 12/2002 | Gamble et al. | |
| 6,509,819 B2 | 1/2003 | Snitchler et al. | |
| 6,597,082 B1 | 7/2003 | Howard et al. | |
| 6,605,885 B2 * | 8/2003 | Laskaris et al. | 310/270 |
| 6,856,053 B2 * | 2/2005 | LeFlem et al. | 310/54 |

FOREIGN PATENT DOCUMENTS

EP 1282220 2/2003

(Continued)

OTHER PUBLICATIONS

EP 04252443 Search Report, Nov. 23, 2006.
Application No. 2,753,394, Canadian Office Action, Nov. 2, 2011.
Office Action from JPO, Japanese Application No. 2004-247904, Nov. 17, 2009.

(Continued)

*Primary Examiner* — Nguyen N Hanh
(74) *Attorney, Agent, or Firm* — Penny A. Clarke

(57) ABSTRACT

An electrical motor/generator is provided with at least one of a superconducting rotor, a stator including dovetailed winding dividers, and a stator cooling arrangement with at least one cooling tube per winding slot positioned such that each armature winding is thermally coupled to at least one cooling tube.

3 Claims, 4 Drawing Sheets

FOREIGN PATENT DOCUMENTS

| | | |
|---|---|---|
| GB | 2331860 | 6/1999 |
| JP | 60118040 A | 6/1985 |
| JP | 2003037970 | 2/2003 |
| JP | 200370228 | 3/2003 |
| WO | 0007286 A1 | 2/2000 |

OTHER PUBLICATIONS

JP2003037970 Abstract, Feb. 7, 2003.

JP2003070228 Abstract, Mar. 7, 2003.

* cited by examiner

US 8,212,437 B2

SUPERCONDUCTING MULTI-POLE ELECTRICAL MACHINE

CROSS-REFERENCE TO RELATED REFERENCES

The present invention is a division of application Ser. No. 10/249,641 filed Apr. 28, 2003, now U.S. Pat. No. 7,547,999.

BACKGROUND OF THE INVENTION

The present invention relates generally to electrical motor/generators, and more particularly to superconducting multi-pole electrical motor/generators.

Multi-pole electrical motor/generators are commonly used in a variety of applications, including generators in large-scale commercial power plants, and motors in small-scale electric vehicles. By way of example, a known electrical generator design includes a multi-pole rotor having a plurality of permanent magnets arranged thereon. The rotor is rotated within the electrical generator by an external drive source, such as a diesel engine. The rotating rotor creates an alternating magnetic field within the electrical generator due to the moving magnets.

The known electrical generator also includes a stator with a plurality of conductive armature windings wound thereon. Because the stator is subjected to an alternating magnetic field from the rotating rotor, an electric current is generated in the armature windings of the stator. This generated electric current can be tapped, thereby creating an electrical power source.

Electrical motor/generator efficiency, however, has been limited by the efficiency of materials used in the conductive windings for the rotor and/or stator (depending on the particular design). Copper windings, for example, experience considerable resistive losses when passing high amperage current therethrough (power loss=current$^2$×resistivity). Hence, superconducting materials (which have a zero resistance; i.e., a resistivity substantially less than that of copper, aluminum, and other commonly used conductive materials) have been used as a winding material for creating low loss electrical motor/generators. See, for example, U.S. Pat. Nos. 6,412,289; and 6,438,969, which are both incorporated by reference herein in their entirety.

Problems exist, however, in known superconducting electrical motor/generators, including cooling the superconducting coils to cryogenic temperatures, supporting cryogenic coils while thermally isolating them from other structures within the electrical motor/generator, and reducing the cost, complexity, size, and weight of the electrical motor/generator.

BRIEF SUMMARY OF THE INVENTION

According to one embodiment of the present invention, a rotor for an electrical motor/generator is provided with at least one cryogenic-temperature coil wound on a coil form, the coil form being fixed to a pole tip of the rotor in such a manner as to accommodate thermal contraction of the at least one cryogenic-temperature coil relative to the pole tip.

According to another embodiment of the present invention, a stator for an electrical motor/generator is provided with a stator yoke, a number of winding dividers each having one end dovetailed to the stator yoke such that adjacent winding dividers define a winding slot there between, and at least one armature winding per winding slot.

According to another embodiment of the present invention, an electrical motor/generator is provided with a stator and a rotor. The stator includes a number of winding slots, at least one armature winding per winding slot, and at least one cooling tube per winding slot and positioned such that each armature winding is thermally coupled to at least one cooling tube.

According to another embodiment of the present invention, an electrical motor/generator is provided with at least one of: (A) a rotor including at least one cryogenic-temperature coil wound on a coil form, the coil form being fixed to a pole tip of the rotor in such a manner as to accommodate thermal contraction of the at least one cryogenic-temperature coil relative to the pole tip, (B) a stator including a stator yoke, a number of winding dividers each having one end dovetailed to the stator yoke, adjacent winding dividers defining a winding slot there between, and at least one armature winding per winding slot, and (C) the stator, the rotor, and at least one cooling tube per winding slot positioned such that each armature winding is thermally coupled to at least one cooling tube. Preferably, the electrical motor/generator includes all of (A), (B), and (C), though the electrical motor/generator may include one of or two of (A), (B), and (C).

BRIEF DESCRIPTION OF THE DRAWINGS

FIG. 2A is an enlarged view of a bracket according to an embodiment of the present invention.

DETAILED DESCRIPTION OF THE INVENTION

Reference will now be made in detail to embodiments of the present invention. Wherever possible, the same reference numbers will be used throughout the drawings to refer to the same or like parts.

Figure 1:
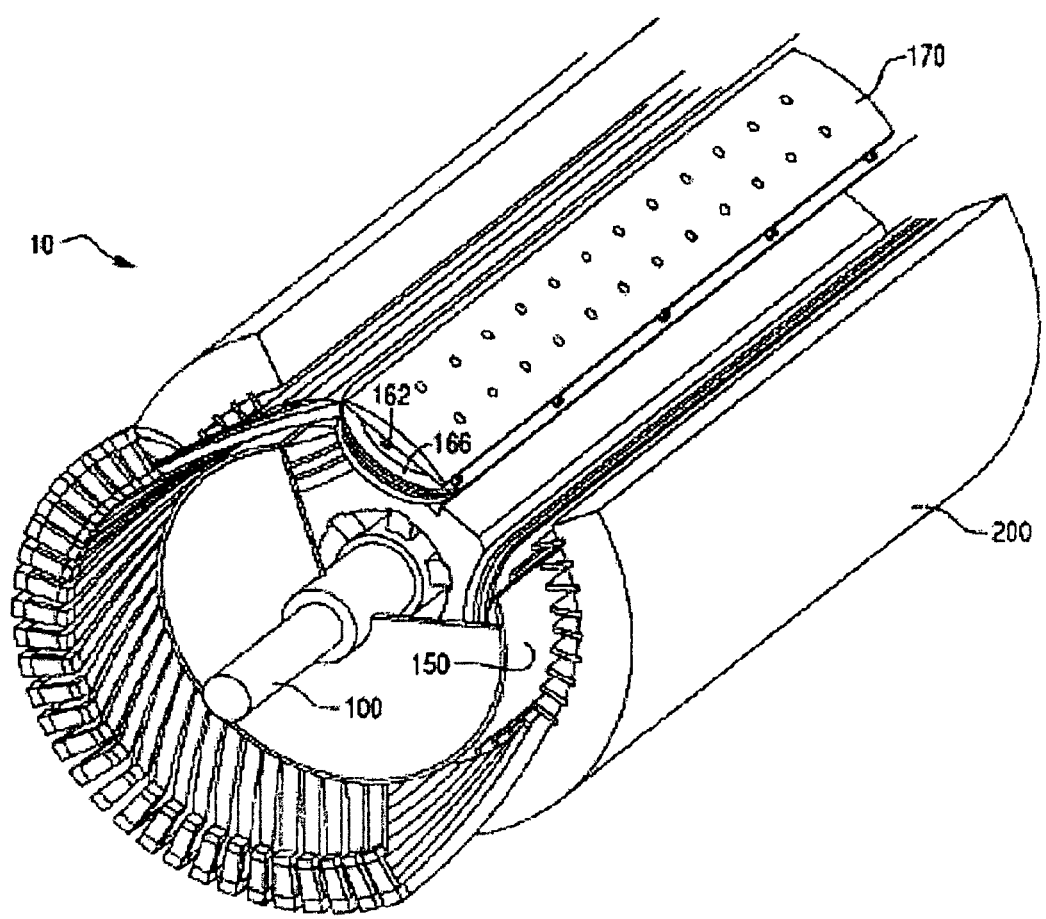
FIG. 1 is a perspective view of an electrical motor/generator according to an embodiment of the present invention.
Figure 2:
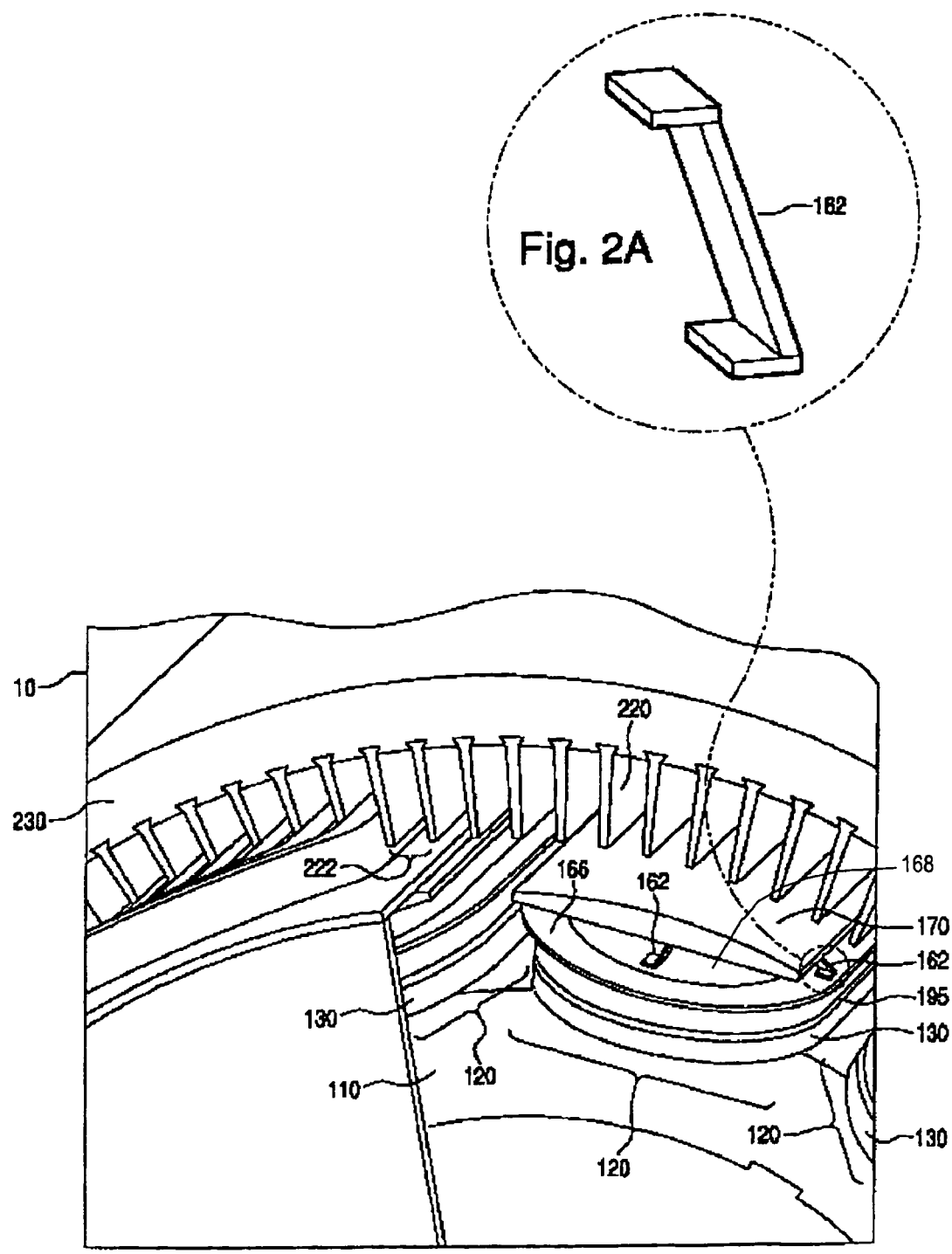
FIG. 2 is an enlarged view of a portion of the electrical motor/generator of FIG. 1.

An electrical motor/generator 10 according to one embodiment of the present invention is shown in the perspective view of FIG. 1, with a portion thereof enlarged in FIG. 2. The electrical motor/generator 10 according to this embodiment includes at least a rotor 100, a stator 200, and a stator cooling arrangement 300 (see FIG. 4). The rotor 100, stator 200, and stator cooling arrangement 300 will be discussed individually below, as these components may be used individually to replace corresponding components in conventional electrical motor/generators. Similarly, any two of or all of the components may be used to further improve a conventional electrical motor/generator. Preferably, however, all three are provided as shown in the perspective view of FIG. 1.

A rotor 100 according to one embodiment of the present invention includes an ambient-temperature magnetic iron hub 110 with a number of poles 164 (FIG. 3), cryogenic-temperature high temperature superconducting (HTS) coils 130 around the rotor poles 164 to provide excitation (see plurality of coils 120 arranged around the rotor's central axis), a vacuum-insulated cryostat enclosing the HTS coil 130 and its support 162, a non-ferrous metallic electromagnetic shield 150 to reduce AC magnetic fields at the HTS coils 130 (which may cause additional losses, undesirable for cryocoolers), and other structural and/or thermal insulating components as would be readily apparent to one of ordinary skill in the art after reading this disclosure.

Preferably, the HTS coils 130 are wound from a HTS wire, comprising one of BSCCO-2223, YBCO, or $MgB_2$ superconducting material, or a similar material. A preferred coil configuration incorporates a HTS wire tape in layer-wound epoxy-impregnated monolithic racetrack coils. The HTS coils 130 may be wound and epoxy-impregnated on a stainless steel coil-form 166, which gives the HTS coils 130 strength and durability. Each coil-form 166 preferably includes a bobbin 160 (FIG. 3) with one side-plate that is used to mount a series of structural support brackets 162 (i.e., one type of structural support) for a given ITS coil 130.

The noted structural support brackets 162 insulate the HTS coils 130 from, and support the HTS coils 130 by, the warm iron pole 164. The structural support brackets 162 preferably comprise a fiber-reinforced composite (FRC) or titanium alloy material, which is designed to withstand the centrifugal loads, shock loads, torque loads, and cool-down thermal loads while minimizing stresses, strains, and conduction heat transfer thereof. As shown in FIG. 2, one end of each coil support bracket 162 is fixed to the coil form side plate, and the other end is attached to the pole tip 170 by a close tolerance sliding fit configured to accommodate the thermal contraction of the HTS coil 130 relative to the pole tip 170. Preferably, the brackets 162 are configured to withstand a coil centrifugal load in the range of about 2,000 to about 5,000 lb, a shock load of at least 100 g's, and a torque load in the range of about 10,000 to about 15,000 ft-lb.

Figure 3:
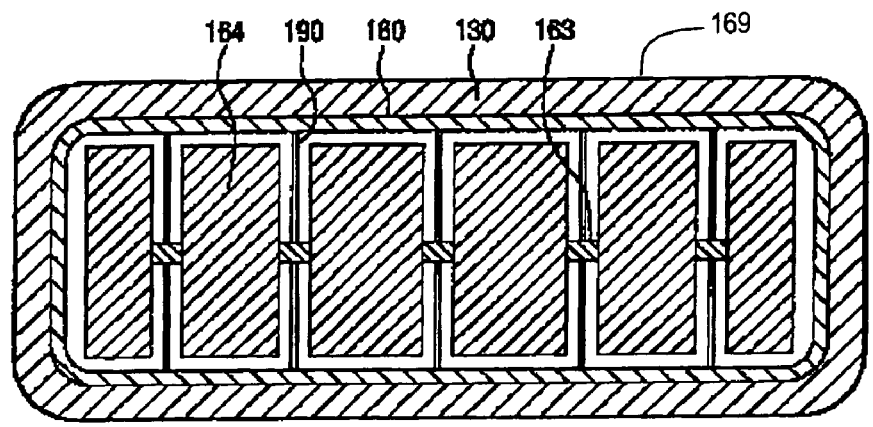
FIG. 3 is a sectional view cut along the axial length of a pole of a rotor according to an embodiment of the present invention.

To provide further support for the HTS coils 130, the substantially straight sections of the HTS coils 130 can be supported by a series of cold transverse struts 190, which are preferably welded to an inner surface of the bobbin 160 and fit in clearance within corresponding slots of the iron pole 164. The center of the transverse struts 190 may be fixed to the warm iron pole 164 or pole tip 170 by support brackets 163 if needed (FIG. 3). As described, the transverse struts 190 enhance the structural rigidity of the HTS coil 130 for torque transmission and centrifugal loading, and provide thermal insulation to the HTS coil 130.

The HTS coils 130 are preferably designed to operate at about 20° K to about 30° K, and thus are cooled by a cryogenic medium (e.g., helium, neon, hydrogen, etc.) that enters via a rotor transfer coupling, circulates around the HTS coils 130 in cooling tube heat exchangers 195 preferably bonded to a thermally conductive foil that is adhesively bonded on an outer surface of each HTS coil 130 (FIG. 2), thereby cooling the HTS coils 130 to the desired operating temperature range. Preferably, the cryogenic medium enters the rotor 100 as a liquid, cools the HTS coils 130 by boiling heat transfer as it circulates through the cooling tube heat exchangers 195, and returns to a cryorefrigerator via the transfer coupling as a gas to be re-condensed. Alternatively, the cryogenic medium can be a gas that cools the HTS coils 130 by forced convection heat transfer as it circulates through the cooling tube heat exchangers 195.

This structure is particularly well suited for low-speed motors and small hydro generators operating at rotational speeds less than about 3600 rpm (preferably less than about 500 rpm), due to the simplified support structure and corresponding smaller size and reduced weight. Moreover, the present inventors have found that this structure is thermally more efficient than known electrical motor/generators, due in part to the effects caused by concentrating the electrical torque load in the iron poles 164 rather than in the HTS coils 130, which reduces the thermal losses in comparison to heavier coil support structures. The reduced thermal loss further improves efficiency by allowing for use of smaller, lower capacity cryorefrigerators (or using the same cryorefrigerator at a reduced power), due to a reduced cooling requirement attributable to the improved thermal efficiency.

Additional advantages to the rotor 100 include reduced manufacturing cost over known air-core superconducting electrical motor/generator designs, due to a reduced amount of expensive HTS wire (e.g., a reduction in total volume between about 3 to about 5 times in comparison to known air-core superconducting electrical motor/generators), since the iron poles 164 shorten the magnetic circuit length. Moreover, torque acting on the rotor 100 is concentrated in the iron poles 164 rather than on the HTS coils 130 themselves, which reduces the strain on the HTS coils 130 that tend to be strain-sensitive. Furthermore, the levels of stator induced magnetic field harmonics through the HTS coils 130 are reduced due to magnetic pole shielding effects, further augmenting the non-ferrous metallic flux shield contributions. Hence, the rotor 100 offers many advantages over known electrical motor/generators.

Figure 4:
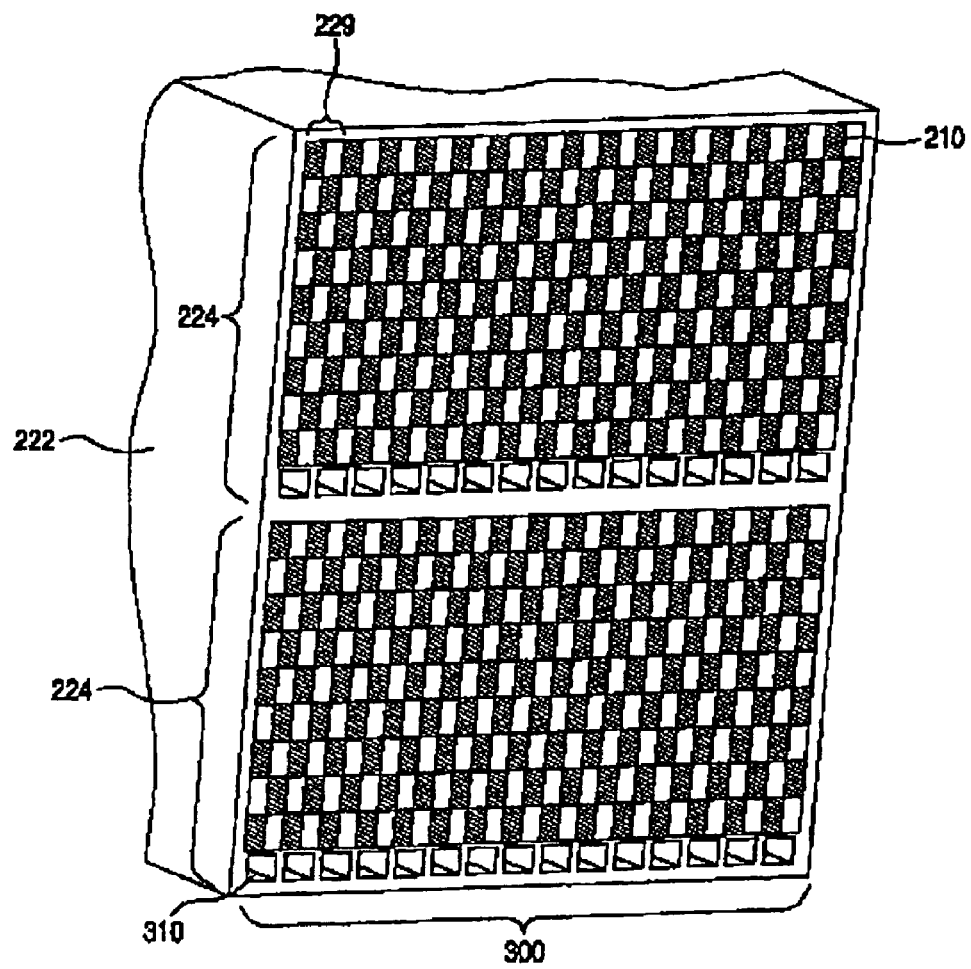
FIG. 4 is a perspective view of a slot with two bars according to an embodiment of the present invention.
Figure 5:
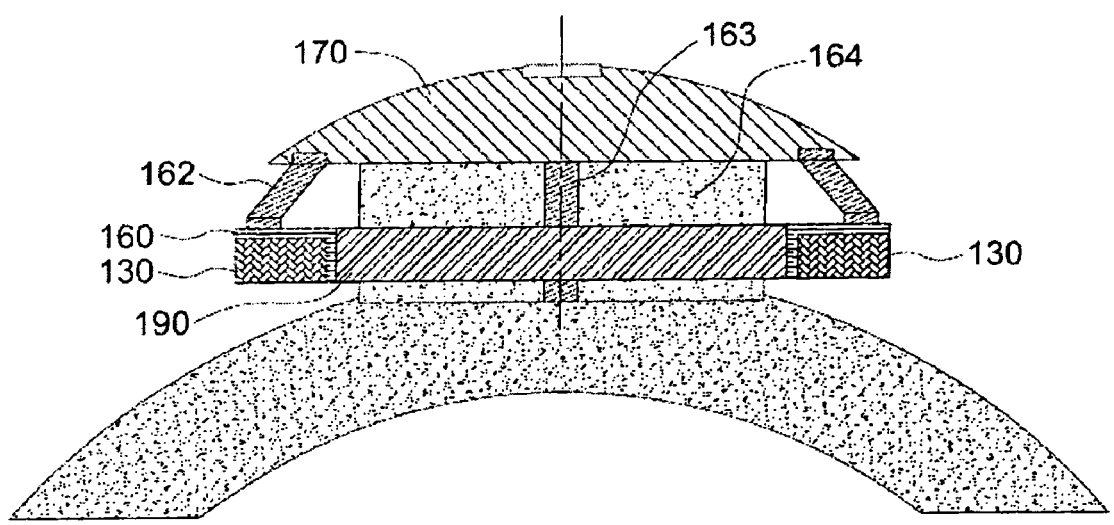
FIG. 5 is a cross-sectional view of a rotor along a slot in a pole illustrating positions of various components of a coil support system relative to each other.

A stator 200 according to another embodiment of the present invention is also shown in the perspective view of FIG. 1, with portions thereof enlarged in FIGS. 2 and 4. As shown in FIG. 2, the stator 200 preferably includes a plurality of non-metallic composite teeth 220 dovetailed into iron yoke laminates 230. The composite teeth 220 are also known as winding dividers, as adjacent composite teeth 220 define a winding slot 222 therebetween.

As shown in FIG. 4, each winding slot 222 preferably includes at least two armature winding bars 224 per winding slot 222, each armature winding bar 224 having at least fifteen winding turns 229 therein. The armature winding bars 224 and composite teeth 220 may be epoxy impregnated by a vacuum-pressure-impregnation (VPI) process to form a solid structure capable of transmitting high torques without being susceptible to tooth vibration or noise. An air-core armature winding with copper AC conductors 210 or the like can then be wound into the winding slots 222 as shown in FIG. 4.

One advantage of the aforedescribed stator configuration is the absence of conventional stator iron teeth, as the composite teeth 220 replace the conventional stator iron teeth. Eliminating conventional stator teeth permits a higher current loading and therefore higher power density than possible with convention electrical motor/generators, because it enables the armature winding to operate with higher magnetic flux densities than the saturation magnetic flux density of iron teeth, and ensures quieter operation of the electrical motor/generator by eliminating stator-tooth-induced cogging torque.

Another advantage of the aforedescribed stator configuration is an improved magnetic flux density over conventional electrical motor/generators. More particularly, the present inventors have found that the air-gap magnetic flux density of this stator configuration is about 1.5 to about 2 times higher than conventional electrical motor/generators, because the air-gap magnetic flux density is no-longer limited by the saturation flux density of the stator iron teeth. Therefore, the power density of the electrical motor/generator 10 can be increased by about 4 to about 5 times that of conventional motor/generators. Hence, the stator 200 offers many advantages over known electrical motor/generators.

A stator cooling arrangement 300 according to another embodiment of the present invention is also shown in FIG. 4. According to this embodiment, at least one cooling tube 310 is provided per winding slot 222, and positioned such that each armature winding is thermally coupled to at least one cooling tube 310. As shown, each turn 229 may include at least 17 solid strands (plus one cross-over space) and at least one cooling tube 310. The solid strands may be transposed in a 360° Roebel winding configuration for the desired magnetic circuit properties, whereas the cooling tubes 310 are preferably not transposed to simply ensure that each solid strand within a turn 229 comes in intimate contact with the corresponding cooling tube 310 of that turn at least once over the length of the armature bar by virtue of the transposition process.

To cool the armature windings, a cooling medium (e.g., de-ionized cooling water) enters the cooling strand at a temperature preferably less than about 25° C., circulates through the various turns 229 thereby cooling the armature windings, and is discharged at a temperature preferably below about 90° C. The inlet cooling medium may be supplied to all the armature coils in parallel from an inlet manifold or the like, and may be discharged in parallel to an outlet manifold or the like.

The aforementioned stator cooling arrangement 300 is more compact than conventional cooling techniques, which allows for an overall reduction in the size and weight of the electrical motor/generator 10. Additionally, the stator cooling arrangement 300 is structurally less complex than conventional cooling techniques, and is thus less costly to manufacture and/or maintain. While the stator cooling arrangement 300 is particularly advantageous for the described electrical motor/generator 10, it should be appreciated that the stator cooling arrangement 300 is applicable to both superconducting electrical motor/generators, and non-superconducting electrical motor/generators.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An electrical motor/generator comprising:
   a rotor comprising at least one cryogenic-temperature coil wound around a coil form, the coil form being fixed to a pole tip of the rotor in such a manner as to accommodate thermal contraction of the at least one cryogenic-temperature coil relative to the pole tip; and
   a stator comprising:
   a stator yoke;
   a plurality of winding dividers each having one end dovetailed to the stator yoke, adjacent winding dividers defining a winding slot therebetween; and
   at least one armature winding per winding slot.

2. The electrical motor/generator of claim 1, wherein the stator further comprises:
   at least one cooling tube per winding slot positioned such that each armature winding is thermally coupled to at least one cooling tube.

3. The electrical motor/generator of claim 1, wherein the rotor further comprises:
   at least one cooling tubing positioned on an outer surface of the at least one cryogenic-temperature coil, the at least one cooling tube being coupled to a cryocooler for cooling a cryogen cooling medium.

* * * * *